United States Patent [19]

Habiger

[11] 4,036,321

[45] July 19, 1977

[54] SINGLE LEVER STEERING CONTROL FOR HYDRAULIC DRIVE VEHICLES

[75] Inventor: Cyril W. Habiger, Joliet, Ill.

[73] Assignee: Caterpillar Tractor Co., Peoria, Ill.

[21] Appl. No.: 663,595

[22] Filed: Mar. 3, 1976

[51] Int. Cl.² .............................................. B62D 11/04
[52] U.S. Cl. ............................... 180/6.48; 74/471 XY; 180/77 H
[58] Field of Search ........................... 180/6.48, 77 H; 74/471 XY, 471 R, 516

[56] References Cited

U.S. PATENT DOCUMENTS

| 3,181,389 | 5/1965 | Richard | 180/6.48 X |
| 3,295,391 | 1/1967 | Ernst et al. | 74/536 |
| 3,323,607 | 6/1967 | Futamata | 180/6.48 |
| 3,541,876 | 11/1970 | Gressard | 74/471 XY |
| 3,620,096 | 11/1971 | Scolari | 180/6.48 X |
| 3,727,481 | 4/1973 | Nicholson | 74/516 X |

Primary Examiner—Joseph F. Peters, Jr.
Assistant Examiner—John A. Pekar
Attorney, Agent, or Firm—Wegner, Stellman, McCord, Wiles & Wood

[57] ABSTRACT

A control for selectively controlling operation of left and right side drives for providing a selective steering drive of a vehicle. The control includes a single manually operable control lever and mounting structure for transmitting selective movement of the control lever through suitable push-pull linkages to the vehicle drives. The control is arranged to effect a change in the gain of output lever portions thereof in effecting the desired controlled steering operation of the drives. The change in gain is controlled by the engagement of rollers associated with the control lever against output levers associated one each with the push-pull linkages and left and right side vehicle drives.

19 Claims, 4 Drawing Figures

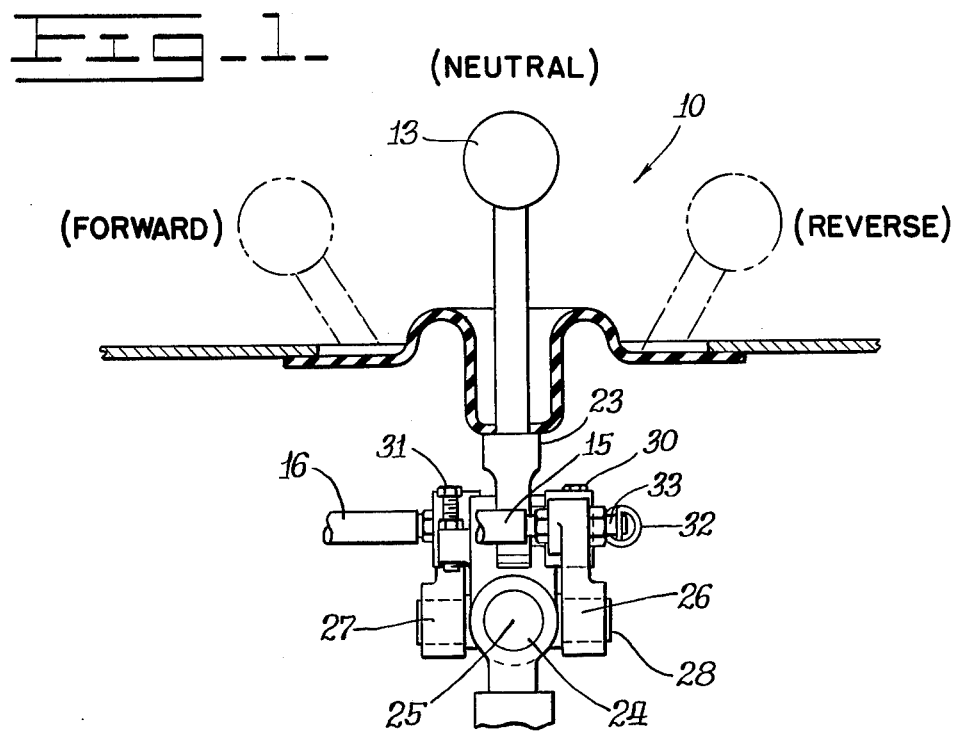
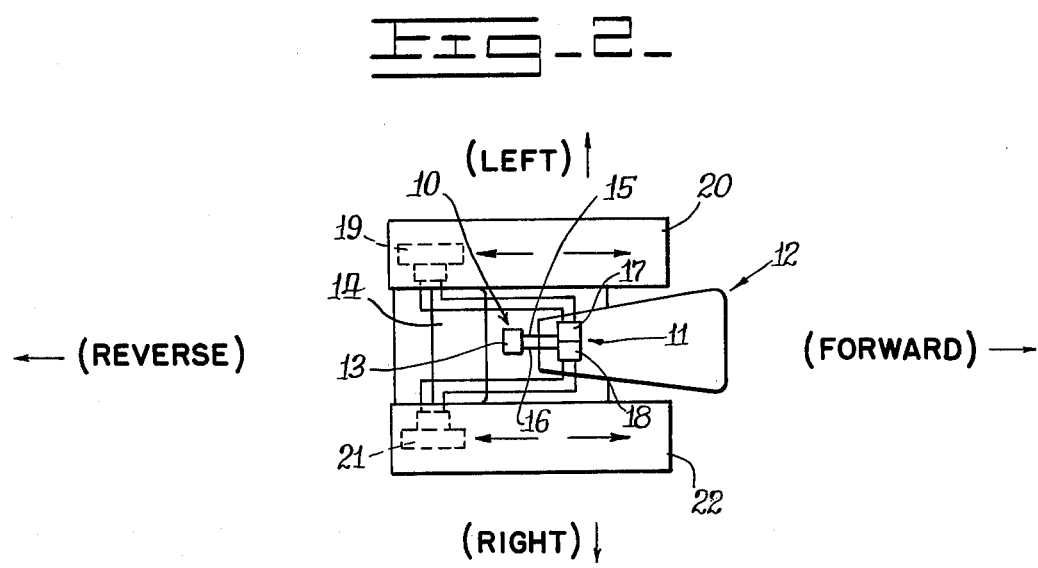

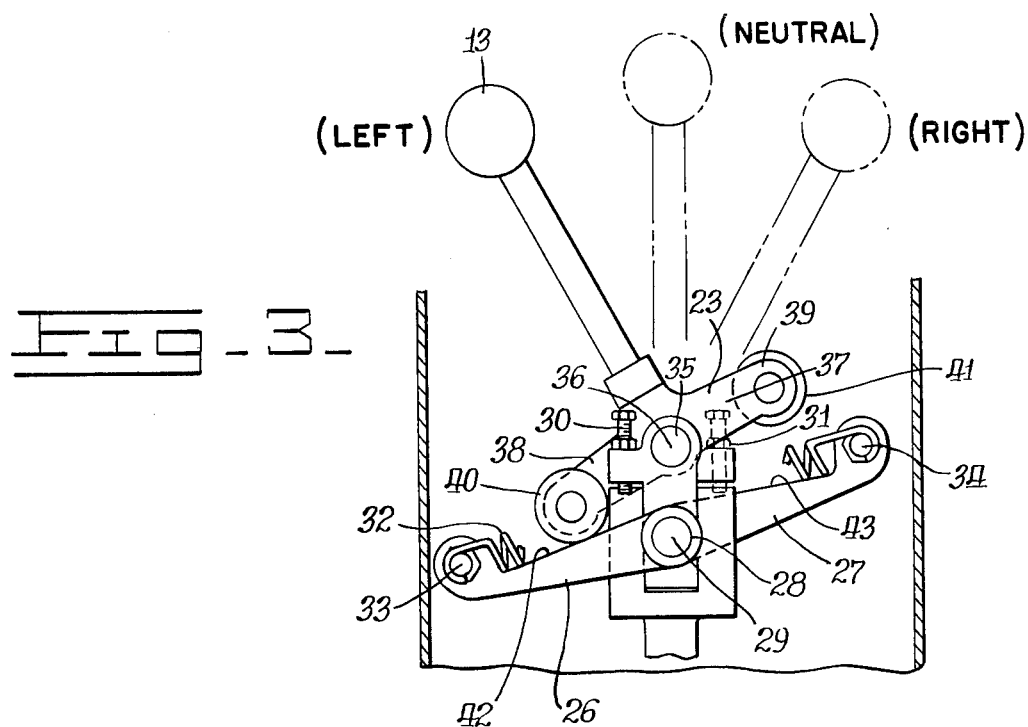
Fig-3-
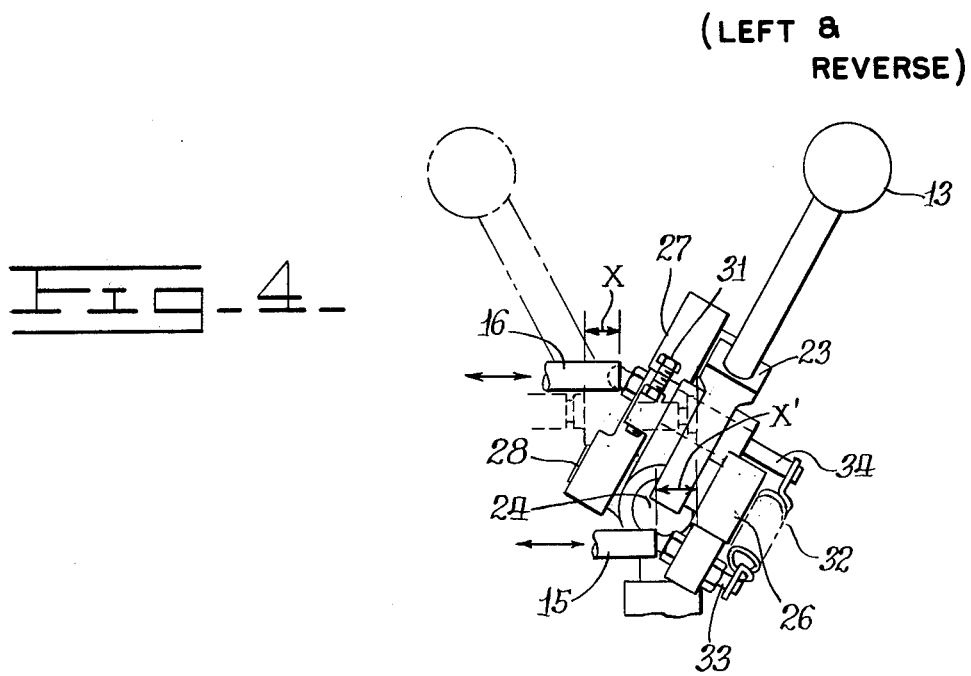
Fig-4-

SINGLE LEVER STEERING CONTROL FOR HYDRAULIC DRIVE VEHICLES

BACKGROUND OF THE INVENTION

1. FIELD OF THE INVENTION

This invention relates to vehicle drive controls and in particular to such controls utilizing a single manually operable control lever for effecting selective steering drive of a vehicle.

2. DESCRIPTION OF THE PRIOR ART

In one conventional form of vehicle, commonly known as a crawler vehicle, hydrostatic drive systems are provided whereby left and right side crawler tracks are selectively driven to provide a desired steering drive of the vehicle. The steering control means is provided adjacent the driver's seat and is connected to the drive systems by conventional push-pull linkages responsive to movement of the control by the driver to effect the desired steering drive of the vehicle.

The present controls for effecting such steering drive are relatively complex ad costly. Because of the complexity, at times, confusion arises in the use of the control in attempting to steeringly drive the vehicle therewith.

One example of a prior art control mechanism for use in controlling the drive of self-laying tracks of crawler-type tractors, is illustrated in U.S. Pat. No. 3,181,389 of Paul P. Richard. As shown therein, a vehicle drive control is provided including two parallel plates provided with arcuate slideways parallel to each other and receiving a slider adapted to be shifted along the slideway and carried on connecting rods. The steering of the tractor is obtained by shifting the ends of the connecting rods along their slideways. The connecting rods have a length such that pivotal movement of the rods with respect to the levers causes the rods at their ends supporting the sliders to generate arcs passing through the axis of the spindle and lying parallel to the arcuate slideways. This arrangement makes it possible to selectively make the slideway system turn without any modification in the relative position of the ends of the connecting rods with reference to the slideways, or else to shift either or both ends of the connecting rod with reference to the corresponding slideways and thereby effect a desired control of the tractor drive means.

In U.S. Pat. No. 3,295,391 of Wolfgang Ernest et al, a locking means for a lever-operated multi-position valve device is shown comprising a lever-operated multi-position control valve device. For actuating the valve actuators of the three valves controlled by the device, three integral arm members extend radially and perpendicularly from a central cylindrical operating handle member, with each of the arm members, including near its outer end, a socket member threadedly received in a through bore in the respective arms and being releasably lockable in any axial position by means of a nut. A combined ball and rod member is disposed for universal movement between each socket member and the corresponding one of the valve actuators so that movement of the shaft about either or both of the pivot pin and shaft for the control operation effects a corresponding downward movement of a valve actuator to effect operation of the corresponding valve device.

Gianni Scolari, in U.S. Pat. No. 3,620,096, shows a single maneuvering level control for tracked vehicles for controlling the delivery of hydraulic fluid of variable feed pumps in track vehicles permitting controlling both tracks of a track vehicle by a single manually operable lever. The maneuvering lever includes a lower section pivotable at its lower end along a horizontal axis and an upper section pivotably mounted on the upper end of the lower section. The upper section is mounted for rotation along an axis orthogonal to the horizontal axis. Means are provided for connecting the upper section to a rocker having arms connected to the delivery regulators of the hydraulic pumps.

SUMMARY OF THE INVENTION

The present invention comprehends an improved control means for selectively controlling the operation of the speed control means of a vehicle drive including left and right side driving means for effecting a selective drive of the vehicle.

More specifically, the invention comprehends the provision of such a control means including a manually operable control lever, mounting means for mounting the control lever for pivotal movement about a transverse first axis, a first operating lever movable with the control lever about the axis for causing selective variable speed forward and rearward operation of the speed control means of the right side driving means, a second operating lever movable with the control lever about the axis for causing selective variable speed forward and rearward operation of the speed control means of the left side driving means, and positioning means movable with the control lever for adjustably changing the disposition of the operating levers relative to each other as a result of movement of the control lever parallel to the axis to effect selectively concurrent and differential operation of the right and left side driving means for causing a desired steering of the vehicle.

The positioning means may comprise roller means on the control lever movably engaging the operating levers.

The operating levers may be pivotably connected to the mounting means for pivotal movement in a direction transverse to the pivotal movement thereof about the axis. In the illustrated embodiment, the pivotal movement of the operating levers is about a second axis extending perpendicularly to the first axis.

Biasing means may be provided for urging the operating levers to a preselected position. The preselected position may correspond to the position thereof providing concurrent operation of the driving means.

The positioning means may comprise a pair of force transfer elements on the control lever spaced at opposite sides of the radius from the axis and engaging one each the operating levers. The force transfer elements are arranged to be effective to selectively vary the pivotal position of the operating levers about the second axis as an incident of pivoting of the control lever about the second axis.

The speed control means may include operating cables connected between the operating levers and the left and right side driving means, respectively.

The control may include stop means adjacent the control levers for limiting the bias movement thereof. The stop means may be adjustable as desired.

In the illustrated embodiment, the operating levers extend in generally opposite directions from the second axis and may be pivotable about a common axis.

Thus, the control means of the present invention is extremely simple and economical of construction while yet providing the highly desirably advantages discussed above.

BRIEF DESCRIPTION OF THE DRAWING

Other features and advantages of the invention will be apparent from the following description taken in connection with the accompanying drawing wherein:

FIG. 1 is a left side view of a vehicle drive control embodying the invention, with portions thereof shown in section;

FIG. 2 is a schematic top plan view of a tractor provided with a drive control embodying the invention;

FIG. 3 is a fragmentary rear elevation of the control; and

FIG. 4 is a left side elevation illustrating the arrangement of the control for effecting a reverse left turn drive of the vehicle.

DESCRIPTION OF THE PREFERRED EMBODIMENT

In the exemplary embodiment of the invention as disclosed in the drawing, a control generally designated 10 is provided for selectively controlling a hydrostatic drive system generally designated 11 of a crawler tractor type vehicle generally designated 12. The control includes a single manually operable lever 13 disposed adjacent the driver's seat 14 of the vehicle and is arranged to selectively operate a pair of push-pull linkages 15 and 16 provided for controlling, respectively, hydraulic fluid pumps 17 and 18 feeding the hydraulic motor 19 of left track 20 and hydraulic motor 21 of right track 22 for selective steering drive of the vehicle 12.

The single control lever 13 controls the hydrostatic drive systems of the tractor to provide an improved facilitated and simplified selective steering drive of the vehicle. As shown in FIG. 1, the control lever 13 may be moved to a forward position or a reverse position from the central neutral position to effect a corresponding forward or reverse drive of the vehicle. As shown in FIG. 3, the control lever may be moved from a neutral position to a left position shown in full lines therein, or a right position shown in broken lines therein to effect a corresponding left or right steering drive of the vehicle. As illustrated in FIG. 4, the movement of the control lever may be such as to effect both a forward or reverse, and a left or right concurrent drive of the vehicle. Thus, the use of the single control lever 13 provides both steering of the vehicle as well as changes in speed and direction of the vehicle travel. The control is so arranged so as to cause the movement of the control lever 13 to correspond to the desired travel of the vehicle, providing further improved saftey in the use of the device.

The speed of the movement of the vehicle is effected by the amount of forward or rearward displacement of the control lever 13, as shown in FIG. 1.

Control lever 13 is mounted to a support block 23 which is rotatable about a lower pivot 24 defining a horizontal axis 25 to permit the control lever to swing to the forward and reverse positions of FIG. 1.

As best seen in FIG. 3, control 10 further includes a pair of output operating levers 26 and 27 individually mounted to a pivot 28 defining a horizontal axis 29 substantially orthogonal to axis 25. Levers 26 and 27 are biased upwardly, as seen in FIG. 3, toward adjustable stops 30 and 31, respectively, by spring means 32 which, in the illustrated embodiment, comprises a single coil spring connected between a spring retainer 33 on the distal end of lever 26, and a spring retainer 34 on the distal end of lever 27. Stops 30 and 31 are adjusted so that when the control lever 13 is in the neutral position of FIG. 1 and in the neutral position of FIG. 3, the abutment of levers 26 and 27 with the stops 30 and 31 causes linkages 15 and 16 to cause pumps 17 and 18 to be in the neutral position whereby no drive of the track motors 19 and 21 is effected. The vehicle drive is, therefore, correspondingly in a neutral position. To effect this control of the pump motors 17 and 18, as shown in FIG. 1, linkage 15 is slightly longer than linkage 16 so as to permit connection of linkage 15 to the lever 26 rearwardly of control lever 13 whereas linkage 16 is connected to the control lever 27 forwardly thereof.

As further shown in FIG. 3, control lever 13 is further mounted for pivotal movement on the pivot 35 for pivoting about an axis 36 parallel to axis 29. More specifically, the control lever 13 is mounted to a T-member 37 pivotally mounted to pivot 35 and carrying at the distal end of opposed arms 38 and 39 thereof a pair of rollers 40 and 41, respectively. Roller 40 is adapted to engage an upper surface 42 on lever 26 and roller 41 is adapted to engage an upper surface 43 on lever 27 so as to effect a movement of the levers selectively downwardly from the abutment with stops 30 and 31 to effect a selective differential movement between the linkages 15 and 16 as a function of the disposition of the control lever 13 in the left or right position shown in FIG. 3.

Thus, as can be seen from reference to FIGS. 1 and 3, with the control lever in the neutral position of FIG. 3, a forward or reverse movement of the control lever, as shown in FIG. 1, will effect a concurrent similar movement of linkages 15 and 16 to effect a concurrent similar operation of pumps 17 and 18 thereby effecting a concurrent similar drive of tracks 20 and 22 by the drive motors 19 and 21 to effect a selective forward or reverse straight drive of the vehicle.

Alternatively, a movement of the control lever 13 toward the left or right position, as seen in FIG. 3, effects a displacement of the corresponding linkage 15 or 16 only, as only one of the output levers 26 or 27 is depressed by the selective movement of the control lever 13 and the resulting depression thereof by the corresponding roller 40 or 41. Resultingly, only one of the linkages 15 or 16 is affected by the movement of the control lever to the left or right of the neutral position, as seen in FIG. 3, whereby only one of the pump motors 17 or 18 is correspondingly operated to effect a corresponding operation of one or the other of the track drive motors 19 or 21.

As a result of the spacing of the rollers 40 and 41 from the axis 36 of pivot 35 and the spacing of axis 36 from the axis 29 of pivot 28 of the output levers 26 and 27, a change in the gain of the control lever 13 effecting the movement of the linkages 15 and 16 is obtained for improved control of the vehicle in the steering drive operation. As will be obvious to those skilled in the art, surfaces 42 and 43 may be selectively cam shaped so as to provide modulated gain in the manipulation of control lever 13, thereby permitting further improved control of the vehicle drive.

Further, the pivotal mounting of the control means may be frictionally held so as to permit maintained setting of the control as desired.

In the illustrated embodiment, the levers 26 and 27 are disposed at opposite sides of the pivot 24 for facilitated manufacture.

The turning of the vehicle is effected by reducing or maintaining a minimum pump motor displacement or loop flow. In the illustrated embodiment, the depression of one or the other of output levers 26 and 27 effects a reduction in the pump motor displacement or loop flow.

As shown in FIG. 4, concurrent speed and/or directional adjustments may be made by lever 13 by both a forward or reverse positioning of the control lever concurrently with a left or right positioning thereof. As shown in FIG. 4, the control lever may be moved to a left position and a reverse position so as to effect a left reverse drive for correspondingly turning the vehicle. In the adjustment of FIG. 4, the left and reverse steering of the vehicle is effected by a lengthening of linkage 16 by the amount X and a shortening of the linkage 15 by an amount X'. As will be obvious to those skilled in the art, the greater the adjustment of the control lever 13 in a forward or reverse direction, as illustrated in FIG. 1, the greater the relative axial shifting of the linkages 15 and 16 will be effected by the left or right positioning of the control lever as a result of the triangulation, or arcing, effect resulting from the displacement of the pivot axes as discussed above and the disposition of the control rollers 40 and 41 relative to the reaction surfaces of the output levers 26 and 27.

In the illustrated embodiment, the combined differential movement of each pump motor control linkage 15 and 16 is preselected to provide from one-half to two-thirds reversing of the respective pumps 17 and 18 for effecting pivot turns of the vehicle. In one embodiment of the invention, the valve actuating lever was approximately 1¼ inches long and was arranged to pivot approximately 17° in each direction to afford the desired vehicle drive control.

The foregoing disclosure of specific embodiments is illustrative of the broad inventive concepts comprehended by the invention.

I claim:

1. For use with a vehicle having opposite sides, a left side driving means having first speed control means, and a right side driving means having second speed control means, improved control means for selectively controlling the operation of said speed control means of said driving means to effect a selective steering drive of the vehicle comprising: a manually operable control lever; mounting means for mounting the control lever for pivotal movement about a transverse first axis; a first operating lever movable with said control lever about said axis; first connecting means connecting said first operating lever to said second speed control means for causing selective variable speed forward and rearward operation of said right side driving means; a second operating lever movable with said control lever about said axis; second connecting means for connecting said second operating lever to said first speed control means for causing selective variable speed forward and rearward operation of said left side driving means; and positioning means movable with said control lever for selectively movably engaging either of said operating levers to adjustably change the disposition of said operating levers relative to each other in parallel planes parallel to said axis as a result of movement of the control lever parallel to said axis to effect differential adjustment of said first and second connecting means and thereby differential operation of the right and left side driving means for causing a desired steering of the vehicle, movement of said control lever and operating levers about said first axis causing concurrent adjustment of said first and second connecting means selectively concurrently with or independently of said differential adjustment.

2. The vehicle steering control means of claim 1 wherein said positioning means comprise roller means on said control lever movably engaging said operating levers.

3. The vehicle steering control means of claim 1 wherein said operating levers are pivotally connected to said mounting means for pivotal movement in a direction transverse to the pivotal movement thereof about said axis.

4. The vehicle steering control means of claim 1 wherein said operating levers are pivotally connected to said mounting means for pivotal movement about a second axis extending perpendicularly to said first axis.

5. The vehicle steering control means of claim 1 wherein biasing means are provided for urging said operating levers to a preselected position providing concurrent operation of the driving means.

6. The vehicle steering control means of claim 1 wherein spring means is provided interconnecting said operating levers for urging said operating levers to a preselected position providing concurrent operation of the driving means.

7. The vehicle steering control means of claim 1 wherein said positioning means is mounted on said control lever.

8. The vehicle steering control means of claim 1 wherein said control lever includes a transverse arm portion, and said positioning means comprises means carried on said arm portion.

9. The vehicle steering control means of claim 1 wherein said positioning means comprises a pair of force transfer elements on said control lever spaced at opposite sides of a radius from said axis and engaging one each said operating levers.

10. The vehicle steering control means of claim 1 wherein said positioning means comprises a pair of force transfer elements on said control lever spaced at opposite sides of a radius from said axis and engaging one each said operating levers, said operating levers being pivotally connected to said mounting means for pivotal movement about a second axis extending perpendicularly to said first axis, said force transfer elements being effective to selectively vary the pivotal position of the operating levers about said second axis as an incident of pivoting of said control lever about said second axis.

11. The vehicle steering control means of claim 1 wherein said connecting means comprise operating cables connected between said operating levers and said left and right side driving means respectively.

12. For use with a vehicle having opposite sides, a left side driving means having first speed control means and a right side driving means having second speed control means, improved control means for selectively controlling the operation of said speed control means of said driving means to effect a selective steering drive of the vehicle comprising: a manually operable control lever having a handle portion and a pair of force transfer portions; mounting means for mounting the control lever for pivotal movement about a first axis, and pivoted movement about a second axis perpendicular to said first axis; a first operating lever mounted to said mounting means for pivotal movement relative to said mounting means about a third axis perpendicular to said first axis; first connecting means connecting said first operating lever to said second speed control means for causing selective variable speed forward and rearward operation of said right side driving means; a second operating lever mounted to said mounting means for pivotal movement relative to said mounting means about an axis perpendicular to said first axis; and second connecting means for connecting said second operating lever to said first speed control means for causing selective variable speed forward and rearward operation of said left side driving means, said force transfer portions of the control lever selectively movably engaging either of said operating levers for adjustably changing the disposition of said operating levers about said third axis as a result of movement of the control lever parallel to said first axis to effect differential adjustment of said first and second connecting means and thereby differential operation of the right and left side driving means for causing a desired steering of the vehicle, movement of said control lever and operating levers about said first axis causing concurrent adjustment of said first and second connecting means selectively concurrently with or independently of said differential adjustment.

13. The vehicle steering control means of claim 12 wherein said force transfer portions comprise roller means.

14. The vehicle steering control means of claim 12 further including spring means for biasing the operating levers to a preselected position providing concurrent operation of the driving means.

15. The vehicle steering control means of claim 12 further including spring means for biasing the operating levers, and stop means adjacent said control lever for limiting the biased movement of the levers to a preselected position providing concurrent operation of the driving means.

16. The vehicle steering control means of claim 15 wherein said stop means comprises adjustable stop means.

17. The vehicle steering control means of claim 12 wherein said operating levers extend in generally opposite directions from said third axis.

18. The vehicle steering control means of claim 12 wherein said operating levers are pivotal about a common axis.

19. The vehicle steering control means of claim 12 wherein said operating levers are pivotal about a common axis orthogonal to said first axis.

* * * * *